United States Patent
Sugizaki

(10) Patent No.: US 7,418,558 B2
(45) Date of Patent: Aug. 26, 2008

(54) INFORMATION PROCESSING SYSTEM, SYSTEM CONTROL APPARATUS, AND SYSTEM CONTROL METHOD

(75) Inventor: Go Sugizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 11/060,488

(22) Filed: Feb. 18, 2005

(65) Prior Publication Data

US 2006/0117149 A1 Jun. 1, 2006

(30) Foreign Application Priority Data

Nov. 29, 2004 (JP) ............................. 2004-343278

(51) Int. Cl.
*G06F 12/00* (2006.01)
*G06F 13/00* (2006.01)
(52) U.S. Cl. .................. 711/146; 711/119; 711/141; 711/144
(58) Field of Classification Search .................. 711/124, 711/146
See application file for complete search history.

(56) References Cited

U.S. PATENT DOCUMENTS 7,159,137 B2 * 1/2007 Nemawarkar et al. ....... 713/503

FOREIGN PATENT DOCUMENTS

JP 2003-150573 5/2003

* cited by examiner

*Primary Examiner*—Hyung Sough
*Assistant Examiner*—Kaushikkumar Patel
(74) *Attorney, Agent, or Firm*—Staas & Halsey LLP

(57) ABSTRACT

A system control apparatus and method capable of increasing the possibility of recovery from a synchronization error in snooping between system controllers are provided. The system control apparatus has a local port that holds a memory access request received externally and reoutputs it in response to an error retry instruction. A broadcast output section broadcasts the memory access request. A broadcast input section receives the broadcast memory access request. A global port holds the received memory access request. A snoop control section transmits and receives cache status information containing a result of snooping, and detects a synchronization error on the basis of the cache status information. If a synchronization error occurs, the snoop control section outputs the error retry instruction to the local port holding the memory access request that resulted in the synchronization error.

10 Claims, 5 Drawing Sheets

INFORMATION PROCESSING SYSTEM, SYSTEM CONTROL APPARATUS, AND SYSTEM CONTROL METHOD

BACKGROUND OF THE INVENTION

1. Field of the Invention

The present invention relates to a system control apparatus and method for implementing snooping in a large-scale information processing system.

2. Description of the Related Art

Let us discuss a multiprocessor system, which is a large-scale information processing system incorporating a large number of CPUs and I/O devices. In the following, a conventional server will be explained as an example of such a multiprocessor system. FIG. 5 is a block diagram showing an example of a conventional server architecture. This server has a plurality of SBs (system boards) 101a and 101b. Here, let us explain a server having two SBs. The SB 101a has CPUs (central processing units) 2a and 2b, IO (input/output) devices 3a and 3b, MEMs (cache memories) 4a, 4b, 4c and 4d, and an SC (system controller) 105a. Similarly, the SB 101b has CPUs 2c and 2d, IO devices 3c and 3d, MEMs 4e, 4f, 4g and 4h, and an SC (system controller) 105b. Thus, one SB contains one SC and a plurality of CPUs, IO devices and cache memories, of which the SC is in charge. The SCs 105a and 105b control memory access from their associated CPUs and IO devices and communications between the SCs.

FIG. 6 is a block diagram showing an example of a conventional SC architecture. The following is a description of the SC 105a. The SC 105b has the same architecture as that of the SC 105a. The SC 105a has a plurality of LPTs (local ports) 111, a broadcast output section 12, a broadcast input section 21, a plurality of GPTs (global ports) 122, and a snoop control section 123. The SC 105a performs snooping for the purpose of checking the status of cache memory and the status of resources related to data transfer. Let us explain the flow of an operation relating to snooping.

FIG. 7 is a timing chart showing an example of an operation relating to a fetch request in the conventional server. The abscissa axes represent time and show, from the top to the bottom, the respective operations of the CPU 2a, the CPU 2b, the SC 105a and the SC 105b. In this example, snooping starts in response to issuance of a fetch request from the CPU 2a and terminates normally.

First of all, the SC 105a receives a memory access request from a CPU or IO device that it is in charge of. Then, the SC 105a sets the memory access request to a local port 111 therein. In the example shown in FIG. 7, a fetch request is issued from the CPU 2a, and the fetch request is set to a local port 111 of the SC 105a. Further, in order to check the status of cache memories belonging to all SCs with respect to data as a target of the memory access, the broadcast output section 12 broadcasts the memory access request set at the local port 111 to all the other SCs as a broadcast request (BC request). When broadcast, the memory access request at the local port 111 is reset.

The broadcast memory access request is received by the broadcast input section 21 in each SC and set to a global port 122. In the example shown in FIG. 7, the BC request broadcast from the broadcast output section 12 in the SC 105a is received by the broadcast input section 21 in the SC 105b. In all the SCs, the identical memory access request is selected from a plurality of global ports 122, and the snoop control sections 123 in all the SCs perform snooping simultaneously. Thereafter, the SCs communicate the respective check results to each other as CST (cache status information), and the snoop control section 123 comprehensively judges the CST from all the SCs and decides the final operation for the memory access request. Snooping between the SCs is performed synchronously in all the SCs, and the CST from all the SCs is received at a fixed timing, thereby facilitating control.

Further, information concerning the memory access request is added to the CST under snooping process in order to prevent the snoop control section 123 from making an operation decision by using erroneous CST when an erroneous memory access request is selected from the global port 122 in a certain SC. The snoop control section 123 compares the memory access request information from all the SCs, thereby detecting a synchronization error in snooping between the SCs.

If the result of decision by the snoop control section 123 shows that the requested operation is unprocessable owing to various exclusive access control with respect to the target address of the memory access request or because of contention between various resources, a retry for snooping is made from the global port 122.

In the example shown in FIG. 7, the fetch request is judged to be processable by the snoop control section 123 in the SC 105a. The snoop control section 123 outputs a reset instruction to the global port 122 where the request has been set. Thereafter, the snoop control section 123 executes memory access processing according to the memory access request. In the example shown in FIG. 7, a copy request is sent to the CPU 2b finding (hitting) the data required in the cache memory. The CPU 2b reads the cache memory and then sends a response to the SC 105a. The SC 105a sends a fetch response to the CPU 2a.

It should be noted that Japanese Patent Application Unexamined Publication (KOKAI) No. 2003-150573 (pp. 5-12, FIG. 1) is known, for example, as prior art related to the present invention.

With the conventional technique, however, error recovery is impossible when an error occurs during broadcast processing or in a case where an erroneous memory access request is selected owing to some error inside a global port that has received broadcast and output to the snoop control section, and the snoop control section of the broadcast source detects a synchronization error between SCs. In such a case, even if a retry is made from the global port as in the case of the ordinary retry processing, it is impossible to recover from the synchronization error because the cause of the error resides in the global port.

SUMMARY OF THE INVENTION

The present invention was made to solve the above-described problem with the prior art.

Accordingly, an object of the present invention is to provide a system control apparatus and method capable of increasing the possibility of recovery from a synchronization error in snooping between SCs.

The present invention provides an information processing system that snoops memory. The information processing system includes a plurality of system control apparatus. Each system control apparatus has a local port that outputs and holds a memory access request received externally. Upon receiving an error retry instruction, the local port reoutputs the memory access request that it holds. A broadcast output section broadcasts the memory access request output from the local port to the other system control apparatus. A broadcast input section receives a memory access request broadcast from the other system control apparatus. A global port outputs and holds the memory access request received by the broadcast input section. A snoop control section performs snooping with respect to the memory access request output from the global port and transmits cache status information containing the check result of the snooping to the other system control apparatus. The snoop control section detects a synchronization error between the system control apparatus on the basis of cache status information received from the other system control apparatus. If a synchronization error occurs, the snoop control section outputs the error retry instruction to the local port holding the memory access request that resulted in the synchronization error.

In addition, the present invention provides a system control apparatus that is connected to a memory and snoops the memory. The system control apparatus includes a local port that outputs and holds a memory access request received externally. Upon receiving an error retry instruction, the local port reoutputs the memory access request that it holds. A broadcast output section broadcasts the memory access request output from the local port to other system control apparatus. A broadcast input section receives a memory access request broadcast from the other system control apparatus. A global port outputs and holds the memory access request received by the broadcast input section. A snoop control section performs snooping with respect to the memory access request output from the global port and transmits cache status information containing the check result of the snooping to the other system control apparatus. The snoop control section detects a synchronization error between the system control apparatus on the basis of cache status information received from the other system control apparatus. If a synchronization error occurs, the snoop control section outputs the error retry instruction to the local port holding the memory access request that resulted in the synchronization error.

In the system control apparatus according to the present invention, the snoop control section further outputs a reset instruction to all global ports when the synchronization error occurs. Upon receiving the reset instruction, the global port resets the memory access request that it holds.

Further, in the system control apparatus according to the present invention, the snoop control section further outputs a reset instruction to the local port and the global port that hold the memory access request for which snooping has terminated normally. Upon receiving the reset instruction, the local port and the global port reset the memory access request that they hold.

In the system control apparatus according to the present invention, the cache status information further contains an identifier of a memory access request to be subjected to the snooping. The snoop control section compares the identifiers obtained from all the system control apparatus to detect a synchronization error.

In addition, the present invention provides a system control method that snoops memory. The method includes the following steps: a local port step of outputting and holding a memory access request received externally; a broadcast step of broadcasting the memory access request output from the local port step to other system control apparatus; a broadcast reception step of receiving a memory access request broadcast from the other system control apparatus; a global port step of outputting and holding the memory access request received by the broadcast reception step; a snoop control step of performing snooping with respect to the memory access request output from the global port step, transmitting cache status information containing the check result of the snooping to the other system control apparatus, detecting a synchronization error between the system control apparatus on the basis of cache status information received from the other system control apparatus, and outputting an error retry instruction if a synchronization error occurs; and an error retry step of reoutputting, when receiving the error retry instruction, the memory access request that the local port step holds and that resulted in the synchronization error.

In the system control method according to the present invention, the snoop control step further outputs a global port reset instruction to all global port steps when the synchronization error occurs. The system control method further includes a global port reset step of resetting the memory access request that the global port step holds when receiving the global port reset instruction.

In the system control method according to the present invention, the snoop control step further outputs a reset instruction when snooping has terminated normally. The system control method further includes a reset step of resetting, when receiving the reset instruction, the memory access request for which the snooping has terminated normally.

In the system control method according to the present invention, the cache status information further contains an identifier of a memory access request to be subjected to the snooping. The snoop control step compares the identifiers obtained from all the system control apparatus to detect a synchronization error.

It should be noted that the system control apparatus described above is an SC (system controller) in the embodiment of the present invention.

According to the present invention, if a synchronization error between SCs occurs during broadcast processing or owing to a failure in a global port, broadcast processing is retried from the local port in the SC of the request issuing source, thereby increasing the possibility of recovering the snooping process from the synchronization error.

The above and other objects, features and advantages of the present invention will become more apparent from the following description of the preferred embodiments thereof, taken in conjunction with the accompanying drawings.

Figure 1:
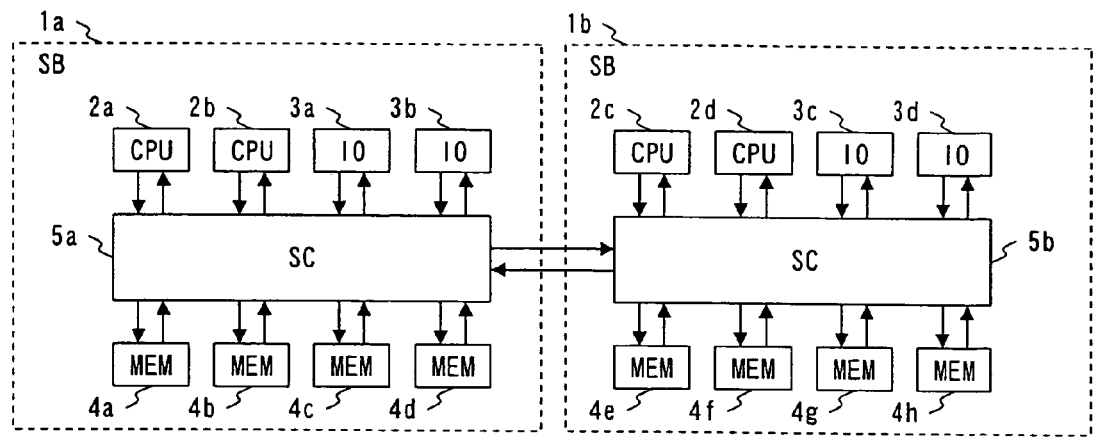
FIG. 1 is a block diagram showing an example of a server architecture according to the present invention.

In the drawings, reference numerals denote as follows: 1*a*, 1*b*, 101*a* and 101*b* are SBs (system boards); 2*a*, 2*b*, 2*c* and 2*d* are CPUs (central processing units); 3*a*, 3*b*, 3*c* and 3*d* are IO (input/output) devices; 4*a*, 4*b*, 4*c*, 4*d*, 4*e*, 4*f*, 4*g* and 4*h* are MEMs (cache memories); 5*a*, 5*b*, 105*a* and 105*b* are SCs (system controllers); 11 and 111 are LPTs (local ports); 12 is a broadcast output section; 21 is a broadcast input section; 22 and 122 are GPTs (global ports); and 23 and 123 are snoop control sections.

DETAILED DESCRIPTION OF THE PREFERRED EMBODIMENTS

An embodiment of the present invention will be described below with reference to the accompanying drawings.

Figure 5:
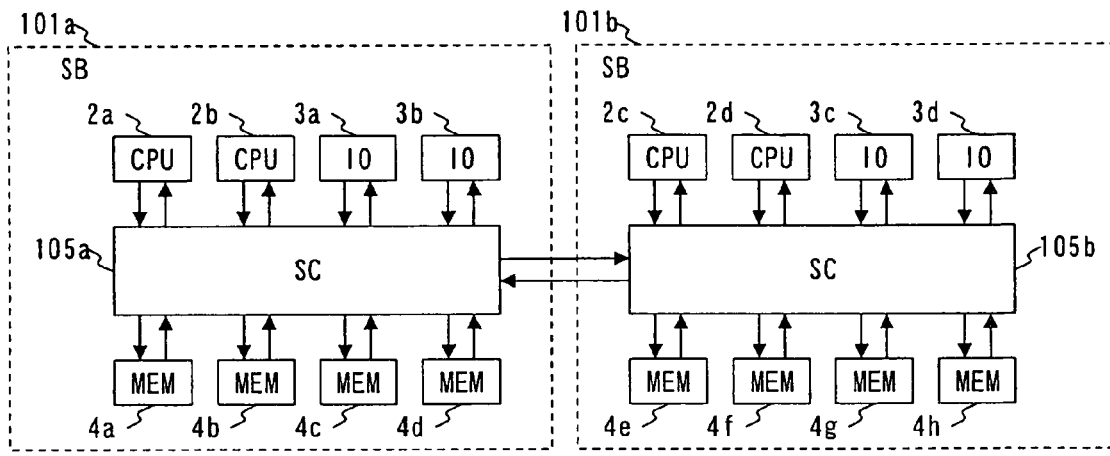
FIG. 5 is a block diagram showing an example of a conventional server architecture.

Let us explain a server as an example of multiprocessor systems, which are large-scale information processing systems. FIG. 1 is a block diagram showing an example of a server architecture according to the present invention. In FIG. 1, the same reference numerals as those in FIG. 5 denote objects that are identical or equivalent to those in FIG. 5, and a description thereof is herein omitted. The server shown in FIG. 1 has SBs (system boards) 1a and 1b in place of the SBs 101a and 101b in FIG. 5, and SCs (system controllers) 5a and 5b in place of the SCs 105a and 105b in FIG. 5. Although the number of SCs in this example is two, the present invention is not necessarily limited to the illustrated server architecture but may be applied to a server having three or more SCs.

Figure 2:
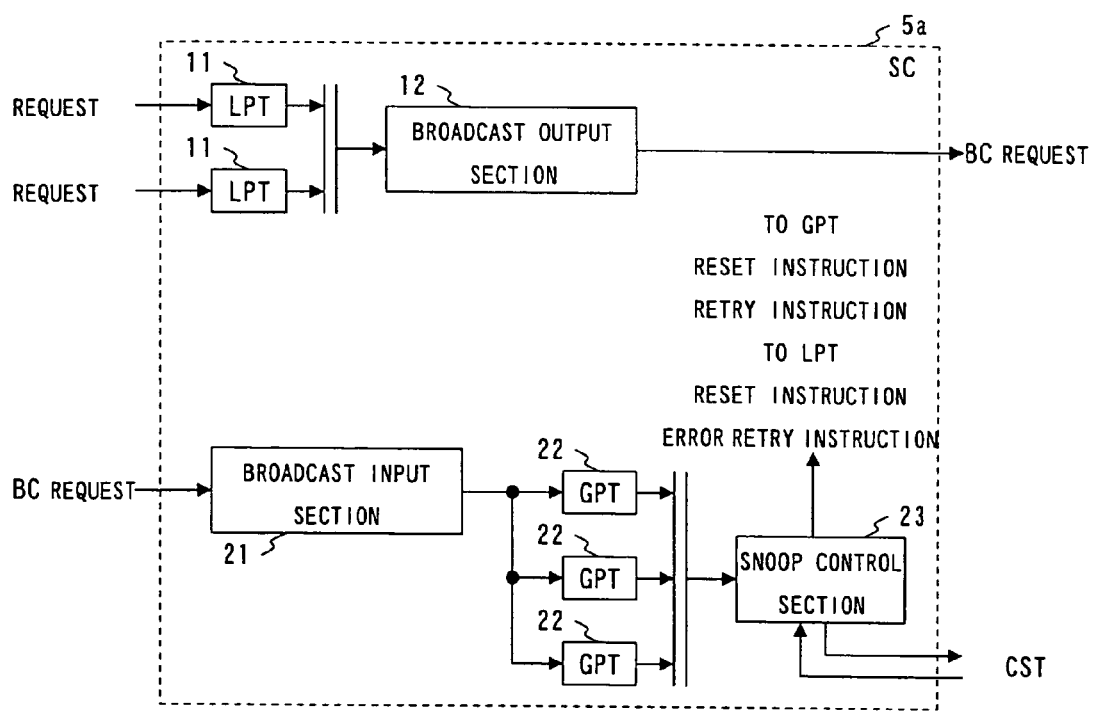
FIG. 2 is a block diagram showing an example of an SC (system controller) architecture according to the present invention.
Figure 6:
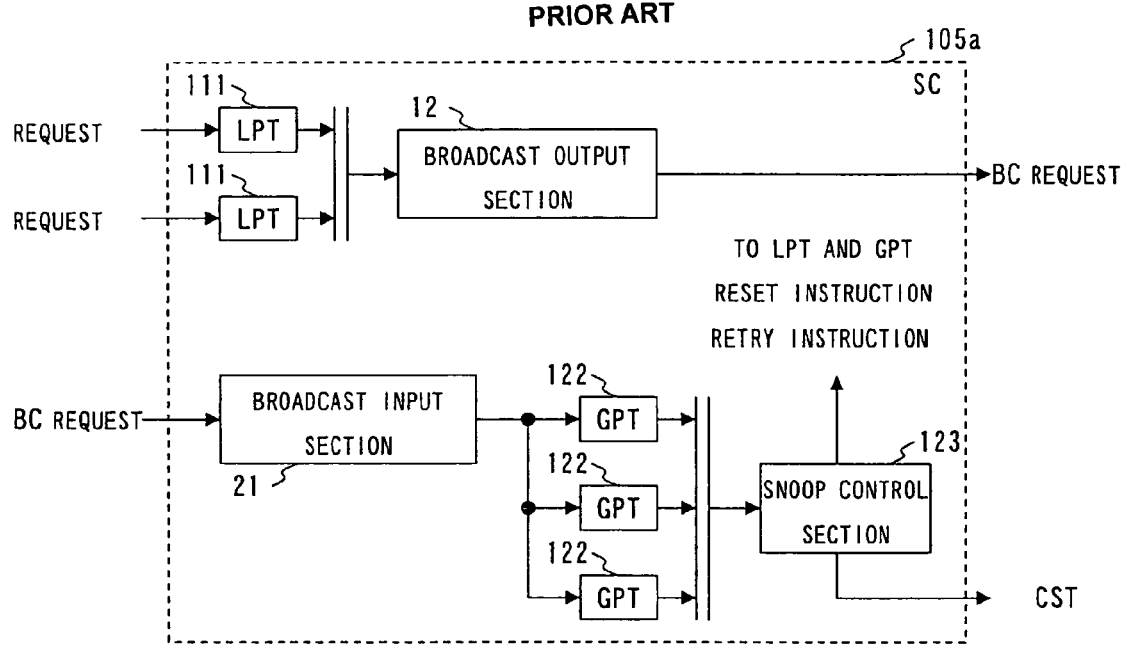
FIG. 6 is a block diagram showing an example of a conventional SC architecture.

FIG. 2 is a block diagram showing an example of an SC architecture according to the present invention. In FIG. 2, the same reference numerals as those in FIG. 6 denote objects that are identical or equivalent to those in FIG. 6, and a description thereof is herein omitted. The SC 5a has local ports 11 in place of the local ports 111 in FIG. 6, and global ports 22 in place of the global ports 122 in FIG. 6. Further, the SC 5a has a snoop control section 23 in place of the snoop control section 123 in FIG. 6.

Figure 3:
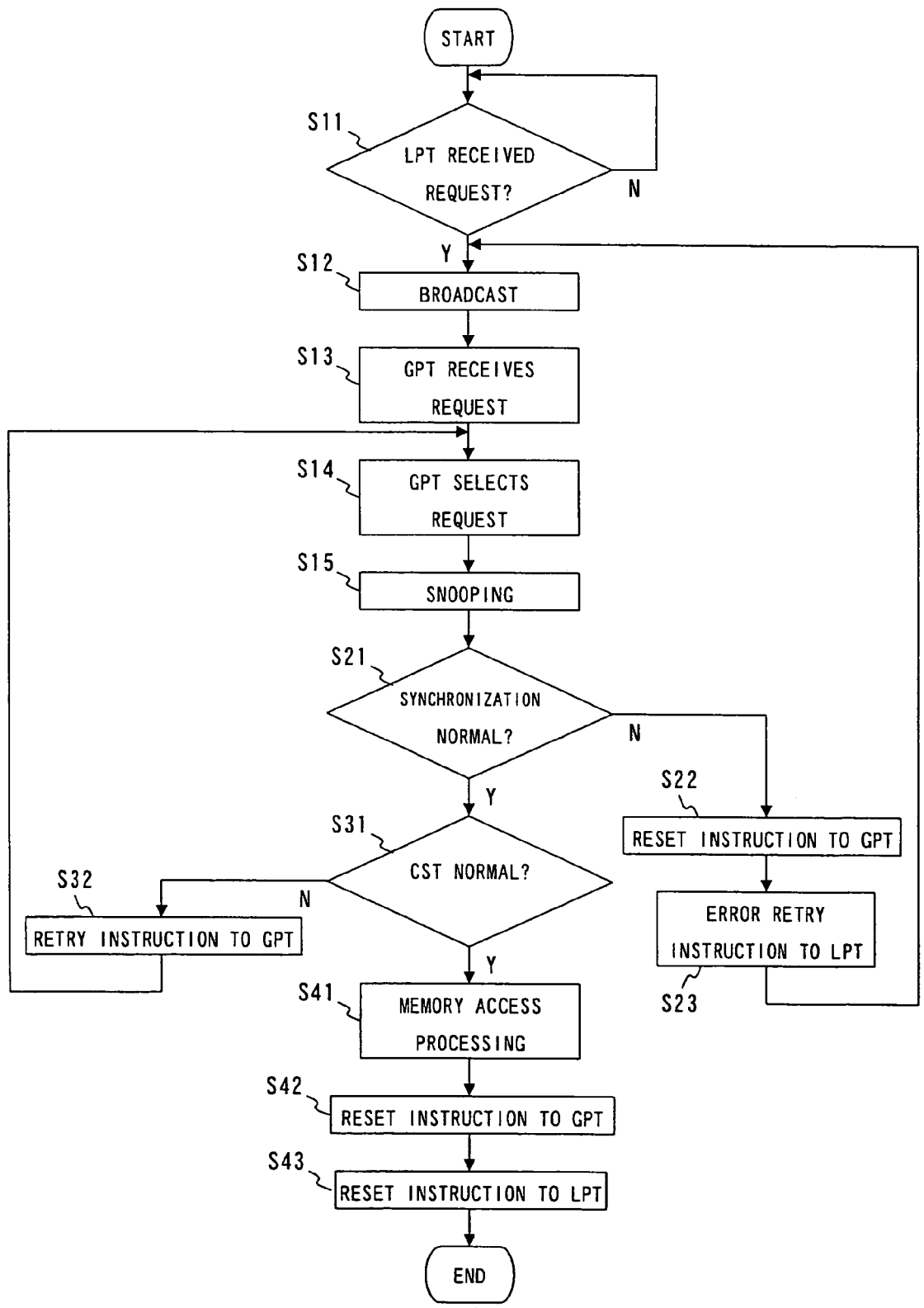
FIG. 3 is a flowchart showing an example of the operation of the SC according to the present invention.

Next, the operation of the SC 5a will be described. The SC 5b operates in the same way as the SC 5a. FIG. 3 is a flowchart showing an example of the operation of the SC according to the present invention. First of all, it is judged (S11) whether or not a local port 11 has received and set a memory access request from any of the CPUs 2a and 2b and the IO devices 3a and 3b, of which the SC 5a is in charge. If no memory access request has been received (if "No" is the answer at S11), the process returns to repeat step S11. If "Yes" is the answer at S11, the broadcast output section 12 broadcasts the memory access request set at the local port 11 to the other SCs (S12). In this example, the memory access request is transmitted to the SC 5b.

At this time, the local port 111 in the conventional server resets the memory access request when it is broadcast. In the present invention, the local port 11 holds the memory access request until it receives a reset instruction from the snoop control section 23. This is done in preparation for error retry processing that is executed when a synchronization error occurs. The number of local ports 11 required is equal to the maximum number of memory access requests that are simultaneously issuable from CPUs and IO devices that the SC 5a is in charge of.

The broadcast memory access request is received by the broadcast input section 21 in each SC and set to a global port 22 (S13). In order to perform synchronous snooping between the SCs, the global ports 22 in all the SCs select the identical memory access request from valid memory access requests held therein and output it to the respective snoop control sections 23 (S14). The global port 22 holds the memory access request until it receives a reset instruction from the snoop control section 23, as in the case of the local port 11.

The snoop control section 23 performs snooping and transmits the check result between all the SCs as CST (cache status information) (S15). At this time, the snoop control section 23 adds an ID of the memory access request under processing to the check result and transmits this as CST. When receiving CST from the other SCs, the snoop control section 23 compares the received CST to the ID of the memory access request under processing, thereby judging whether or not synchronization has been established normally (S21).

If there is a synchronization error (if "No" is the answer at step S21), the snoop control section 23 outputs a reset instruction to all the global ports 22 (S22). In the SC of the request issuing source that issued the memory access request that resulted in the synchronization error, the snoop control section 23 outputs an error retry instruction to the local port 11 corresponding to the memory access request (S23). Then, the process returns to step S12. If synchronization has been established normally (if "Yes" is the answer at S21), the snoop control section 23 comprehensively judges the CST from all the SCs and decides whether or not the requested memory access is processable (S31).

If the result of judgment of the CST shows that the requested operation is unprocessable owing to various exclusive access control or contention between various resources, i.e. the CST is erroneous (if "No" is the answer at S31), the snoop control section 23 outputs a retry instruction to the global port 22 corresponding to the request judged to be unprocessable (S32). Then, the process returns to step S14. If the requested operation is processable, i.e. the CST is normal (if "Yes" is the answer at S31), memory access processing is executed according to the memory access request (S41). Then, the snoop control section 23 outputs a reset instruction to the global port 22 corresponding to the memory access request (S42). In the SC of the memory access request issuing source, the snoop control section 23 outputs a reset instruction to the local port 11 corresponding to the memory access request (S43). Then, the flow is terminated.

Upon receiving the respective reset instructions, the local port 11 and the global port 22 reset the memory access request concerned. When receiving an error retry instruction, the local port 11 reoutputs the memory access request concerned to the broadcast output section 12. When receiving an ordinary retry instruction, the global port 22 reoutputs the memory access request concerned to the snoop control section 23.

As has been stated above, in the present invention, an error retry due to a synchronization error in snooping is executed not from the global port 22 but from the local port 11 in the SC of the request issuing source. Thus, error recovery is attempted by restarting the process, including broadcast processing.

Figure 4:
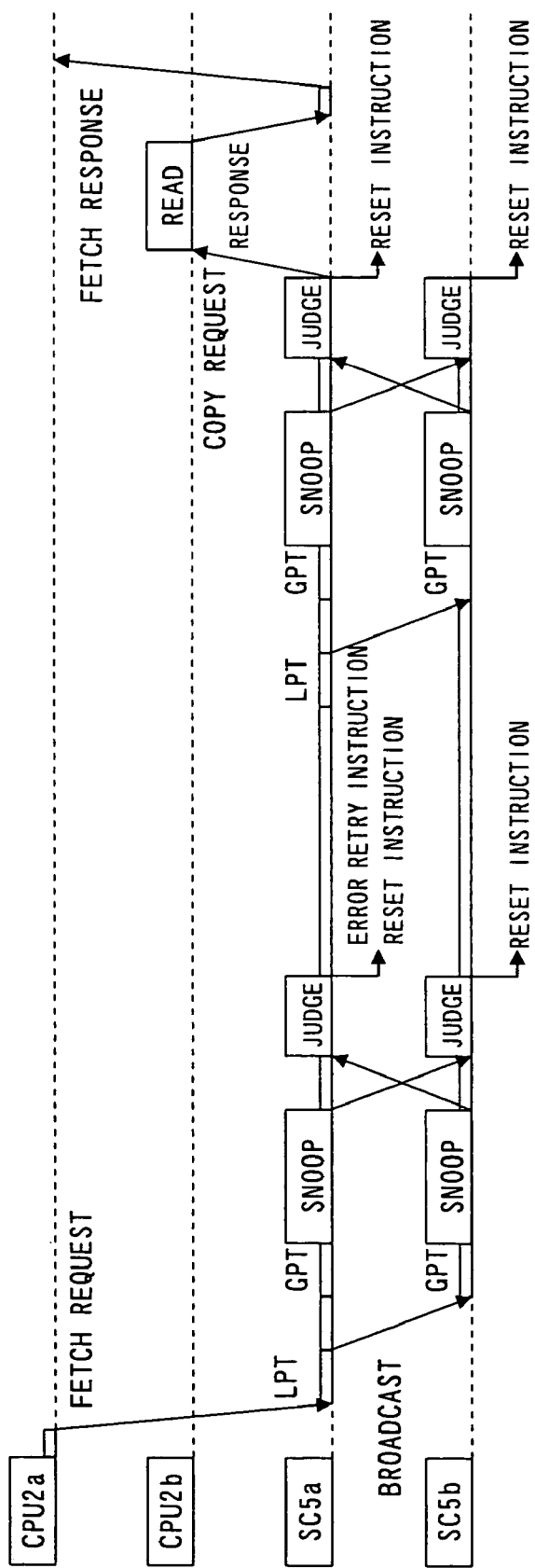
FIG. 4 is a timing chart showing an example of an operation relating to a fetch request in the server according to the present invention.
Figure 7:
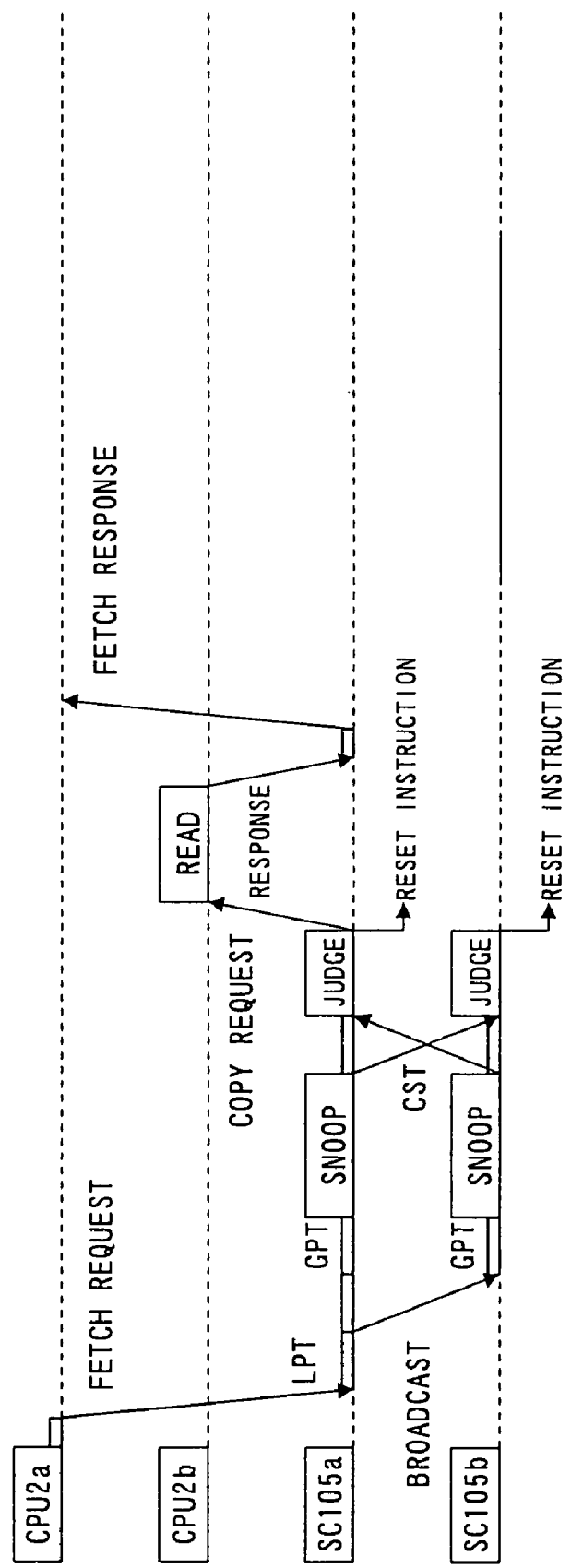
FIG. 7 is a timing chart showing an example of an operation relating to a fetch request in the conventional server.

FIG. 4 is a timing chart showing an example of an operation relating to a fetch request in the server according to the present invention. As in the case of FIG. 7, the abscissa axes in FIG. 4 represent time and show, from the top to the bottom, the respective operations of the CPU 2a, the CPU 2b, the SC 5a and the SC 5b. In this example, snooping starts in response to issuance of a fetch request from the CPU 2a in the same way as in FIG. 7. In this case, however, a synchronization error occurs in the snooping process. The snoop control section 23 in the SC 5a performs snooping and, as a result, detects a synchronization error by comparison of CST. Consequently, the snoop control sections 23 in the SCs 5a and 5b output a reset instruction to the global ports 22. Further, the snoop control section 23 in the SC 5a of the request issuing source outputs an error retry instruction to the local port 11. Error retry processing is executed from the local port 11 in the SC 5a of the request issuing source. Thereafter, a normal operation similar to that shown in FIG. 7 is performed.

It should be noted that the present invention is not necessarily limited to the foregoing embodiments but can be modified in a variety of ways without departing from the gist of the present invention.

What is claimed is:

1. An information processing system that snoops memory, said information processing system having a plurality of system control apparatuses, each of said system control apparatuses comprising:
    a local port that holds a memory access request received from outside the system control apparatus but not from another system control apparatus, outputs the memory access request, and reoutputs the memory access request that it holds upon receiving an error retry instruction;
    a broadcast output section that broadcasts the memory access request output by said local port to other system control apparatuses;
    a broadcast input section that receives the memory access request that has been broadcast;
    a global port that holds the memory access request received by said broadcast input section, and outputs the memory access request; and
    a snoop control section that receives the memory access request from the global port, performs snooping with respect to the received memory access request and transmits cache status information containing a check result of said snooping to the other system control apparatus, wherein
    said snoop control section detects a synchronization error between the system control apparatus and the other system control apparatuses based on cache status information received from the other system control apparatuses, and if a synchronization error occurs, said snoop control section outputs said error retry instruction to said local port holding the memory access request whose broadcast resulted in detecting the synchronization error.

2. A system control apparatus that is connected to a memory and snoops said memory, said system control apparatus comprising:
    a local port that holds a memory access request received from outside the system control apparatus but not from another control system apparatus, outputs the memory access request, and reoutputs the memory access request that it holds upon receiving an error retry instruction;
    a broadcast output section that broadcasts the memory access request output from said local port to other system control apparatuses;
    a broadcast input section that receives any broadcast memory access request;
    a global port that holds the memory access request received by said broadcast input section, and outputs the memory access request; and
    a snoop control section that receives the memory access request from the global port, performs snooping with respect to the received memory access request and transmits cache status information containing a check result of said snooping to the other system control apparatus, wherein said snoop control section detects a synchronization error between the system control apparatus based on cache status information received from the other system control apparatus, and if a synchronization error occurs, said snoop control section outputs said error retry instruction to said local port holding the memory access request whose broadcast resulted in detecting the synchronization error.

3. A system control apparatus according to claim 2, wherein said snoop control section further outputs a reset instruction to said global port when said synchronization error occurs, and upon receiving the reset instruction, said global port resets the memory access request that it holds.

4. A system control apparatus according to claim 2, wherein said snoop control section further outputs a reset instruction to said local port and said global port that hold the respective memory access request if snooping has detected no error, and upon receiving said reset instruction, said local port and said global port reset the respective memory access request that they hold.

5. A system control apparatus according to claim 2, wherein any cache status information further contains an identifier of a memory access request related to which said snooping is performed, and said snoop control section compares said identifiers included in the cache status information received from the system control apparatuses to detect a synchronization error.

6. A system control method performed by a system control apparatus that snoops memory from a plurality of system control apparatuses in a system, said method comprising:
    receiving a memory access request from outside the system control apparatus but not from another control system apparatus;
    holding the memory access request in a local port of the system control apparatus;
    broadcasting the memory access request to other system control apparatuses;
    receiving any broadcast memory access request;
    holding the received memory access request in a global port of the system control apparatus;
    outputting the memory access request from the global port;
    snooping with respect to the memory access request, transmitting cache status information containing a check result of said snooping to the other system control apparatuses, detecting a synchronization error between the system control apparatus and the other system control apparatuses based on cache status information received from the other system control apparatus, and outputting an error retry instruction if a synchronization error occurs; and
    reoutputting the memory access request that said local port holds and whose broadcast resulted in detecting the synchronization error, when the error retry instruction is received by the local port of the system control apparatus.

7. A system control method according to claim 6, wherein said snooping includes:
    outputting a global port reset instruction to the global port when synchronization error occurs; and
    resetting the global port step holds the memory access request when receiving said global port reset instruction.

8. A system control method according to claim 6, wherein said snooping includes:
    outputting a reset instruction when snooping has not detected any error; and
    resetting the local port and the global port holding the respective memory access request for which said snooping has not detected any error.

9. A system control method according to claim 6, wherein said cache status information further contains an identifier of the memory access request to be subjected to said snooping; and
    wherein said snooping includes comparing identifiers obtained from cache status information received from the other system control apparatuses to detect a synchronization error.

10. A method performed by a system control apparatus that detects errors in synchronizing with other system control apparatuses by snooping, said method comprising:

holding a memory access request received from system components controlled by the system control apparatus in a local port of the system control apparatus;

broadcasting the memory access request held in the local port;

holding the memory access request received from broadcasting in a global port of the system control apparatus;

outputting the memory access request from the global port;

snooping with respect to the memory access request held in the global port;

retrying to output the memory access request from the global port if cache status information achieved by snooping indicates a synchronization error;

resetting the global port and repeat broadcasting of the memory access request from said local port if a synchronization error is detected based on the cache status information achieved by snooping.

* * * * *